UNITED STATES PATENT OFFICE.

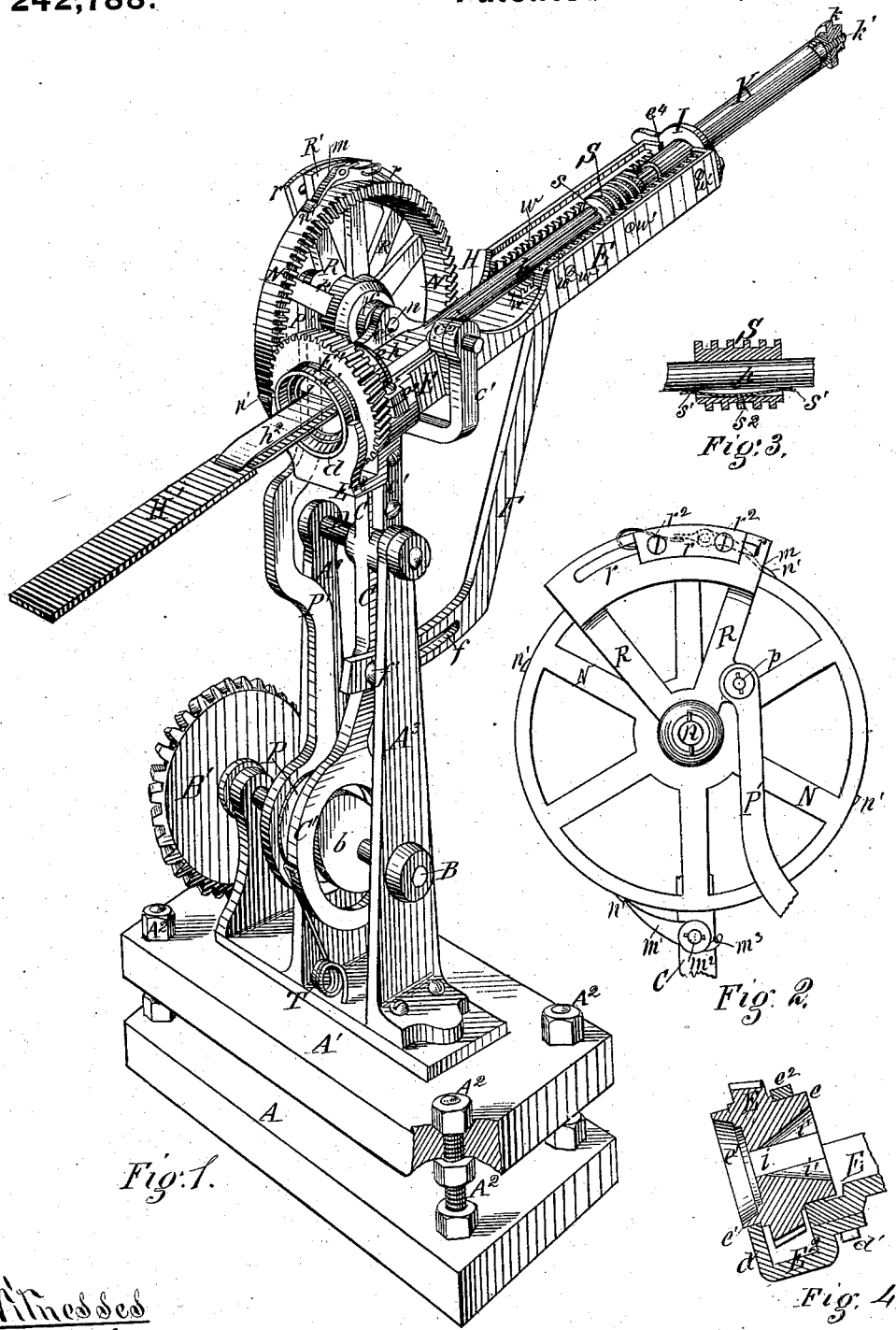

DAVID K. MILLER, OF KNOXVILLE, (PITTSBURG P. O.,) ASSIGNOR OF ONE-HALF TO P. C. KNOX, OF ALLEGHENY CITY, AND JAMES H. REED, OF PITTSBURG, PENNSYLVANIA.

NAIL-PLATE FEEDER.

SPECIFICATION forming part of Letters Patent No. 242,788, dated June 14, 1881.

Application filed April 2, 1881. (No model.)

*To all whom it may concern:*

Be it known that I, DAVID KNOX MILLER, of Knoxville, (Pittsburg P. O.,) county of Allegheny, State of Pennsylvania, have invented or discovered a new and useful Improvement in Nail-Plate-Feeding Machines; and I do hereby declare the following to be a full, clear, concise, and exact description thereof, reference being had to the accompanying drawings, making a part of this specification, in which— like letters indicating like parts—

Figure 1 is a perspective view of my improved nail-plate-feeding machine. Fig. 2 is a view, in elevation, of a part of the gear mechanism for rotating the plate; and Figs. 3 and 4 are sectional views of parts of the feed mechanism, presently described.

My invention relates to mechanism for feeding nail-plates to nail-cutting machines; and it consists of a machine having its feed mechanism proper mounted on a vibrating bar, by rocking which the nail-plate is drawn back and lifted preparatory to turning without changing the relative positions of the several parts of the feed mechanism, also having a plate-holder mounted in and movable with the apparatus, as stated, to which intermittent rotary motion is given for turning the plate by means of continuous gear-wheels operated by a reciprocating ratchet-sector, and such rotary motion is employed in giving forward feed to the plate-holder by means of an exteriorly-threaded nut or sleeve arranged to slide longitudinally on the stem of the holder under a determined force or pressure greater than that required to feed such nut or sleeve working as worm-gearing in toothed bars on one or more sides of its line of feed, by which construction the plate-holder is moved forward on each half-turn, but is free to slip back or yield within the nut or sleeve in case resistance is encountered greater than the force which holds the nut on the stem of the holder.

The several parts of this machine are constructed and arranged as follows:

In the drawings, A A' represent a double bed-plate, the upper plate, A', being vertically adjustable by means of bolts $A^2$. The purpose of this adjustment will presently appear.

Upon the plate A' are erected plumber-blocks or bearing-posts $A^3$, in which are journaled a driving-shaft, B, and a rock-shaft, D.

To the upper or rock-shaft D is secured a vertical vibrating bar, C, which extends upward and carries the feed mechanism proper, as presently described, and also extends downward, and by a yoke or head, C', incloses an eccentric, $b$, on shaft B. Rotation of this shaft by suitable gearing B', having connection with the train which drives the nail-machine, will impart to C vibratory motion on the rock-shaft D, in proper harmony with the motions of the nail-cutter. I also prefer to give the cam and yoke such form (well known in the art) that the bar may have a short period of rest at the limits of its motion. This vibratory motion of bar C is employed to raise the nail-plate off the cutting-anvil and draw it back, in which position the plate is given a half-turn; also, to carry the plate downward and forward after turning upon the cutting-anvil or bed-shear, in which position the nail is cut from the plate. These results are secured by the following construction:

To the bar C, above shaft D, is rigidly bolted an angle-bar, $c'$, which, with the extended end $c$ of bar C, forms a fork, between the arms of which a rectangular feed-box, E, is hung by hinge or pivot connections $c^2$.

To the under side of box E, toward its outer end, is rigidly bolted an angle or bent brace, F, which extends downward and forward, making adjustable connection with bar C, below shaft D, by means of slot $f$ and bolt $f'$. The slot $f$ is curved, with its center in the line of the pivot-connection $c^2$, and by the adjustment thus provided the feed-box E may be set at any desired angle of inclination to a horizontal plane, or to the cutting-dies in the nail-machine. When the bolt $f'$ is bound tight the brace F and pivots $c^2$ form substantially a rigid connection between the feed-box and the vibrating bar C, so that the motions of the bar will be communicated to the feed-box. In the forward end of this box is journaled a rotary pinion, E', having hollow hub-extensions $e\ e'$ on either side, the rear one, $e$, being secured in a suitable journal-box, $e^2$, on the end of E, and the forward one, $e'$, resting on a bearing, $d$, formed in the angle-plate $E^2$, which latter is securely bolted to the under side of box E as at $d'$. If desired, a cap or top bearing-plate may be placed over the bearing $d$, though ordinarily this will not be necessary. A slit or elongated opening, $i$, is made through the center of wheel $E'$, through which the nail-plate and forward end of the plate-holder are passed; and to facilitate insertion and removal of the plate and holder the walls $i'$, leading to this slit $i$ from the rear side, are sloped outward, as illustrated in Fig. 4.

The plate-holder H is provided with the usual nippers, $h^2$, for holding the nail-plate H'. From the base of the nippers the shank $h'$ is made flat through such part of its length as passes into or through the slit $i$ in feeding. Through the remainder of its length the stem $h$ of the holder may be made round or of other desired form, as presently described, and it is extended sufficiently to rest in a concave seat or bearing, $e^4$, in the rear end of the feed-box, so that the plate-holder, when in place, lies lengthwise within the feed-box, and is supported by the pinion $E'$ at one end and by the bearing $e^4$ at the other end.

In order to prevent the rear end of the plate-holder from tilting up under the weight of the nail-plate and the motion of the machine, a pivoted clasp or clip, I, is swung over the holder and fastened at its free end, so as to form a removable top bearing for the holder near its outer end. Other convenient means may be employed, however, for this purpose.

It is obvious that with the plate-holder thus secured in the feed-box the vibratory motion given to bar C will cause the nail-plate H' to move upward and backward with one vibration or movement of C, and downward and forward with the reverse movement of C. While the plate is thus drawn up and back it is given a half-rotation through pinion $E'$ by the following means:

A crown-wheel, N, is mounted idle on a pin or short shaft, $n$, which latter is rigidly secured in the upper end, $c$, of bar C. The wheel N gears with $E'$, and is, by preference, double the size of the latter, so that one-quarter revolution of N will give to $E'$ one-half revolution. This relationship may be varied, however, if desired.

Intermittent rotary motion is given wheel N as follows: A cam, P, on shaft B gives vertically-reciprocating motion to a bar, P', which bar incloses the cam at its lower end, and, extending upward, makes connection by wrist-pin $p$ with a reciprocating sector, R, which is also journaled loose on the end of pin $n$. This sector carries on its arc or periphery a slotted plate, $r$, to which a pawl-block, R', is secured by clamping-plate $r'$ and screw-bolts $r^2$. By these means the pawl-block may be secured in any desired position on the slotted arc-plate $r$.

To the side face of block R', over the wheel N, is pivoted a spring-pawl, $m$, which is arranged to bear its free end upon the periphery of the wheel. Stops or lugs $n'$ are made at intervals on the periphery of N, in the plane of the pawl, of proper form and arrangement to be engaged by the pawl as it is moved forward with sector R, reciprocating motion being given to the sector by cam-bar P', as described. This will give a part rotation to wheel N, and by regulating the extent of motion of sector R, and spacing the stops $n'$ at proper intervals, depending upon the relative sizes of wheels N and $E'$, such part rotation is made to give a half-rotation to the pinion, so as to turn the nail-plate as stated. Upon the up or reverse movement of the sector the pawl $m$ rides over the stops $n'$, and to hold wheel N against any tendency to move backward under friction a holding-pawl, $n'$, is pivoted to bar C by post $m^2$, and a spring, $m^3$, holds this pawl against the periphery of N, on its under side, in position to engage the stops $n'$ as against back motion of the wheel, but to ride over such stops as the wheel moves forward.

It will be observed that the toothed part of wheels N and $E'$ is continuous through their entire circumferences, and the rotation of the nail-plate is always in the same direction. The time when such rotation is given may be regulated, with relation to the movements given by bar C above described, by adjusting cams $b$ and P on shaft B, to operate their respective bars in proper succession. The rotary motion thus given the plate-holder is employed in giving forward feed motion as follows:

On the stem $h$ of the plate-holder is fitted an exteriorly-threaded nut or sleeve, S, by feather-and-groove connection $s$. The sleeve may thus slide endwise on the stem without rotating around it. The same results may be secured, however, without the feather and groove, by making the stem and the hole through the sleeve of other than circular form. I prefer the form shown, on account of ease in fitting. This sleeve or nut is held upon the stem with a determined degree of pressure by a jib-spring, $s'$, seated in the bore of the sleeve, and pressed upon the stem with any desired force by a pressure-screw, $s^2$. Practically this pressure is such as to prevent slipping of the nut on the stem under ordinary resistance in feeding; but in case the machine feeds strong against the gage of the nail-cutter, which is a desirable feature and commonly practiced in hand-feeding, the plate-holder will slip or yield backward slightly under the spring $s'$, and thereby prevent breakage, which otherwise would be apt to follow "strong" feeding by machinery. I consider this an important feature in my improved machine.

On the inner side walls and bottom of feed-box E are secured by screws $w'$ or otherwise toothed bars $w$, the teeth being adapted to gear with the threaded surface of nut S. As the holder and nut are rotated by pinion $E'$ they will be carried forward by the action of the threaded nut on the teeth of the bars.

In order to secure greater or less feed, as desired, the bars $w$ and nut S may be replaced with others having the desired pitch of threads adapted to give the required feed; or, as the required range in a machine of given size is comparatively small, the pitch of thread on S and w may be such as to give the maximum feed for a machine of that size, and then setting the feed-gage in the nail-machine so as to allow only such amount of feed for successive nails as may be desired. The excess of feed given by the nut S will then be taken up by the back slipping of the holder under the jib-spring s', as above described. The toothed bars w are made a little longer than the full extent of feed required on the machine.

In order to arrest the forward feed at the desired point, or when the plate has been worked up, I secure a head or collar, k, on the outer end of the stem, and this collar coming against the clasp I, or the outer end of the feed-box, will prevent further forward movement of the holder; but in case the machine continues running the sleeve or nut S will then slide forward on the stem h, slipping under the spring s' instead of moving the holder. Ordinarily the attendant will allow the plate-holder to stop its feed before he removes it to insert another plate, and for this reason, as well as on account of the back slipping of the holder, as described, it will usually be found necessary to slide the nut outward toward the end of the stem before the holder is again put in place. This can be done without difficulty, and partly for the purpose of forming a guide or stop, against which the nut may be thus moved, and partly for convenience in handling, I fit a loose sleeve, K, on the outer end of the stem h, extending it forward to the desired position of the nut at the beginning of the feed. This sleeve K is secured loosely on the stem, or so as to turn freely thereon, by passing the reduced end k' of the stem through the perforated head or end of the sleeve, and holding it in place by the nut or screw-head k.

It is obvious that one toothed bar, w, may be employed instead of three, though I prefer the arrangement shown, owing to the fact that the plate holder has some range of lateral motion in the slit i, which might, in some cases, be sufficient to throw one toothed bar out of gear with nut S.

It is a desirable feature in this class of machines that the plate-holder should have some range of lateral motion, and several forms of devices are known in the art for pressing one edge of the nail-plate against a fixed guide while the nail is severed. One such device is shown and described in patent granted to me February 1, 1881, No. 237,119, and this or other desired construction of pressing device and guide may readily be adapted by the skilled mechanic to the present machine.

Owing to change in form of the cutters of the nail-machine, or for other reasons, it is sometimes desirable to change the angle of inclination of the nail-plate. This may readily be done, as before described, by means of the slotted brace F; but such change will also involve the raising or lowering of the feed mechanism in order to cause the plate to make proper presentation to the nail-cutters. This may be done within the small range required by means of the bolts $A^2$ connecting the plates A A'.

By the means herein shown and described for supporting and operating the plate-holder within the feed-box the greatest facility is secured for removing and inserting said holder when required. This is especially owing to the employment of an open-sided box, E, having its toothed surfaces w so disposed that the threaded nut S can be lifted out of engagement therewith; and by opening or closing the clasp I the holder may be either inserted or removed at pleasure while the machine is either running or at rest.

If desired, a spring, T, may be employed to press the yoke C' against the cam b, so as to counterbalance the weight of the feed-box and secure smooth steady running of the machine.

It is obvious that the rock-shaft D may be placed at the end of bar C, below the cam b, instead of above it, changing thereby the order of leverage of the bar, but without changing the operation of the machine. Also, an ordinary crank and pitman-bar may be employed instead of cam P and bar P'; or the bars C and P' may receive motion direct from some part or parts of the nail-cutter, if so preferred. Also, the wheel N may sustain to pinion E' any other relation which may be desired—as three to one, or four to one—and six or eight stops n' be employed instead of four, as described. These and similar modifications in the details of construction I consider as coming within my invention.

In practice I prefer to give the sector R a range of motion slightly in excess of the movement to be given wheel N; or, in other words, the pawl is withdrawn a little from each stop n' before the reverse or forward motion commences, thus insuring engagement when the machine is running at considerable speed as well as when running slow.

I claim herein as my invention—

1. In a nail-plate feeder, a pivoted supporting-bar, C, in combination with feed-box E, nail-plate holder H, gear mechanism for giving the holder rotary and forward feed motion, such feed-box, plate-holder, and gear mechanism being carried on and movable with the bar, and driving mechanism for giving bar C vibratory motion on its pivot, substantially as and for the purposes set forth.

2. The combination of pivoted vibrating bar C, feed-box E, having a hinge or pivot connection with the upper end of bar C, plate-holder H, adjusting-brace F, and means for raising and lowering the plate-holder for presentation to the nail-cutter independent of the adjustment given by brace F, substantially as set forth.

3. The combination of a feed-box having a rotary gear-pinion journaled thereon, a nail-plate holder passing through and rotated by the pinion, a wheel, N, arranged to gear with and rotate the pinion, reciprocating sector R, and mechanism adapted to cause engagement between the sector and wheel N when the sector is moved in one direction, and to release such engagement when the sector is moving in the reverse direction, substantially as set forth.

4. The combination of feed-box E, pinion E', holder H, continuous gear-wheel N, sector R, pawl-block R', the same being adjustable along the arc of the sector, spring-pawl m, stops n', holding-pawl m', and mechanism for giving to the sector reciprocating motion part way around wheel N, substantially as set forth.

5. A feed-box, E, having gear-teeth formed longitudinally on one or more of its inner side walls, in combination with rotary plate-holder H, exteriorly-threaded nut S, arranged to slide longitudinally on the stem of the plate-holder, and to gear with the toothed sides of the box, and means for holding nut S on the stem with a determined degree of pressure, substantially as and for the purposes set forth.

6. The combination of feed-box E, having one or more toothed side walls, $w$, rotary plate-holder H, sleeve or nut S, adapted to slide longitudinally on the stem of the holder, jib-spring $s'$, and tension-screw $s^2$, substantially as set forth.

7. The combination of feed-box E, plate-holder H, sliding nut S, tension-spring $s'$, one or more toothed bars, $w$, sleeve-stop K, and feed-stop $k$, substantially as set forth.

8. The open-sided feed-box E, having one or more inner toothed side walls, $w$, in combination with rotary pinion E', journaled on the box, plate-holder H, sliding nut S, and pivoted or hinged clasp I, substantially as set forth.

In testimony whereof I have hereunto set my hand.

DAVID KNOX MILLER.

Witnesses:
R. H. WHITTLESEY,
C. L. PARKER.